(12) United States Patent
Bowater et al.

(10) Patent No.: US 8,543,704 B2
(45) Date of Patent: Sep. 24, 2013

(54) METHOD AND APPARATUS FOR MULTIMODAL VOICE AND WEB SERVICES

(75) Inventors: Ronald John Bowater, Hampshire (GB); Charles Willard Cross, Jr., Wellington, FL (US); Leslie Robert Wilson, Boca Raton, FL (US); Yuk-Lun Wong, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 11/910,301

(22) PCT Filed: Apr. 6, 2006

(86) PCT No.: PCT/EP2006/061380
§ 371 (c)(1),
(2), (4) Date: Oct. 1, 2007

(87) PCT Pub. No.: WO2006/108795
PCT Pub. Date: Oct. 19, 2006

(65) Prior Publication Data
US 2009/0144428 A1    Jun. 4, 2009

(30) Foreign Application Priority Data
Apr. 8, 2005  (EP) ...................... 0507148

(51) Int. Cl.
*G06F 15/16* (2006.01)
*G06F 11/00* (2006.01)
*G10L 21/00* (2006.01)
*G01R 31/08* (2006.01)
*H04J 1/16* (2006.01)
*H04L 1/00* (2006.01)

(52) U.S. Cl.
USPC ........... 709/227; 709/223; 709/225; 709/226; 709/228; 704/270; 704/270.1; 370/229; 370/230

(58) Field of Classification Search
USPC ................ 709/219, 310, 223–229; 704/200, 704/270, 270.1; 370/229–231, 235
See application file for complete search history.

(56) References Cited

U.S. PATENT DOCUMENTS
6,519,246 B1   2/2003 Strahs
6,973,093 B1 * 12/2005 Briddell et al. ............... 370/421
(Continued)

FOREIGN PATENT DOCUMENTS
JP  11-103348 A   4/1999
JP  2003-288356 A  10/2003

*Primary Examiner* — Tae Kim
(74) *Attorney, Agent, or Firm* — Jordan IP Law, LLC

(57) ABSTRACT

A voice server can be located, temporarily allocated, and sent audio. The results are returned to a voice client, and the voice server is deallocated for use by the next person talking into their client browser. Voice channels and IVR ports are initially set up by a switch and the IVR using conventional audio protocols. The voice channels are not initially connected to the client. The switch handles the allocation and deallocation of IVR voice channels without having to communicate further with the IVR. A user indicates to the client device that he wishes to initiate a voice interaction during an X+V session. This translates to a request on the CTRL channel to synchronise XHTML and VXML forms as a trigger for the VXML browser to execute a conversational turn. A multiplexer intercepts this control command and establishes a virtual voice circuit between the client device and an existing open but unattached voice port. The virtual circuit is established without having to set up an RTP channel. The CTRL signal is then forwarded to an interaction manager so that the conversation can take place. At the end of the conversation the virtual circuit is disconnected.

17 Claims, 2 Drawing Sheets

(56) References Cited

U.S. PATENT DOCUMENTS

| | | | |
|---|---|---|---|
| 7,028,306 B2 * | 4/2006 | Boloker et al. | 719/310 |
| 7,185,094 B2 * | 2/2007 | Marquette et al. | 709/225 |
| 7,269,562 B2 * | 9/2007 | Leask et al. | 704/275 |
| 7,685,252 B1 * | 3/2010 | Maes et al. | 709/217 |
| 7,925,512 B2 * | 4/2011 | Cross et al. | 704/275 |
| 2002/0143874 A1 * | 10/2002 | Marquette et al. | 709/204 |
| 2002/0194388 A1 * | 12/2002 | Boloker et al. | 709/310 |
| 2003/0088421 A1 | 5/2003 | Maes et al. | |
| 2003/0162561 A1 * | 8/2003 | Johnson et al. | 455/553 |
| 2003/0182622 A1 * | 9/2003 | Sibal et al. | 715/511 |
| 2005/0261908 A1 * | 11/2005 | Cross et al. | 704/270.1 |
| 2006/0064302 A1 * | 3/2006 | Ativanichayaphong et al. | 704/235 |
| 2006/0136222 A1 * | 6/2006 | Cross et al. | 704/275 |

* cited by examiner

METHOD AND APPARATUS FOR MULTIMODAL VOICE AND WEB SERVICES

This invention relates to a method and apparatus for multimodal voice ad web services.

BACKGROUND

As devices become smaller, modes of interaction other than keyboard and stylus are a necessity. In particular, small handheld devices like cell phones and PDAs serve many functions and contain sufficient processing power to handle a variety of tasks. Present and future devices will greatly benefit from the use of multimodal access methods.

Multichannel access is the ability to access enterprise data and applications from multiple methods or channels such as a phone, laptop or PDA. For example, a user may access his or her bank account balances on the Web using an Internet browser when in the office or at home and may access the same information over a dumb phone using voice recognition and text-to-speech when on the road.

By contrast, multimodal access is the ability to combine multiple modes or channels in the same interaction or session. The methods of input include speech recognition, keyboard, touch screen, and stylus. Depending on the situation and the device, a combination of input modes will make using a small device easier. For example, in a Web browser on a PDA, you can select items by tapping or by providing spoken input. Similarly, you can use voice or stylus to enter information into a field. With multimodal technology, information on the device can be both displayed and spoken.

Multimodal applications using XHTML+Voice offer a natural migration path from today's VoiceXML-based voice applications and XHTML-based visual applications to a single application that can serve both of these environments as well as multimodal ones. A multimodal application integrates voice interface and graphical user interface interaction by setting up two channels, one for the graphical user interface and another for the voice. At the time of writing the XHTML+Voice (X+V) Profile 1.2 was published at www.voicexml.org on 16 Mar. 2004.

In a known implementation of a multimodal browser with remote voice processing a voice channel is set up between the client and the voice server and allocated to carry the voice data for the duration of the voice interaction within a X+V session. The voice channel is disconnected after the voice interaction and the X+V session continues. For each separate interaction within the X+V session a new voice channel must be set up since this avoids consuming costly voice resources on the server when the X+V session is idle.

Setting up and closing down a voice channel for each voice interaction has the disadvantage of increasing the response time of each and every voice interaction due to the time taken to open and close voice channels using present protocols (SIP and RTP). The added latency is a direct function of the network bandwidth available between the device and the server. This causes problems on low bandwidth networks such as slow internet connections and on a slow wireless network. For instance, the network bandwidth on pre-3G wireless networks is limited.

SUMMARY OF INVENTION

According to a first aspect of the present invention there is provided a method or controlling an audio connection from an audio interface to an audio processor comprising setting up a processor link for audio data with the audio processor; setting up an interface link for audio data with the audio interface in an interface session in response to the setting up of the audio interface session; connecting the processor the start of an audio interaction within the interface session whereby audio data can flow between the audio interface session and the audio processor; disconnecting the processor link and the interface link in response to a signal indicating the end of the audio interaction; and taking down the interface link in response to the end of the interface session.

Giving control of virtual voice channel connect and disconnect to an intermediate controller allows both the client and server to trigger connects and disconnects.

The audio processor may be an interactive voice response system with an optional voice server for speech recognition and/or text-to-speech.

The audio interface can be a VoiceXML browser or a XML browser with voice functionality for multimodal operation.

The method further comprises buffering the audio data if there is a delay connecting the interface link with the processor link.

The setting up a processor link with the audio processor step comprises negotiating a RTP connection using SIP protocol.

The signal triggering the start of an audio interaction is a pre-existing signal indicating the start of a multimodal dialogue.

The signal triggering the end of an audio interaction is a pre-existing signal indicating the synchronisation of fields in a multimodal dialogue.

DESCRIPTION OF DRAWINGS

Embodiments of the invention will now be described, by means of example only, with reference to the accompanying drawings in which.

DESCRIPTION OF THE EMBODIMENTS

Figure 1:
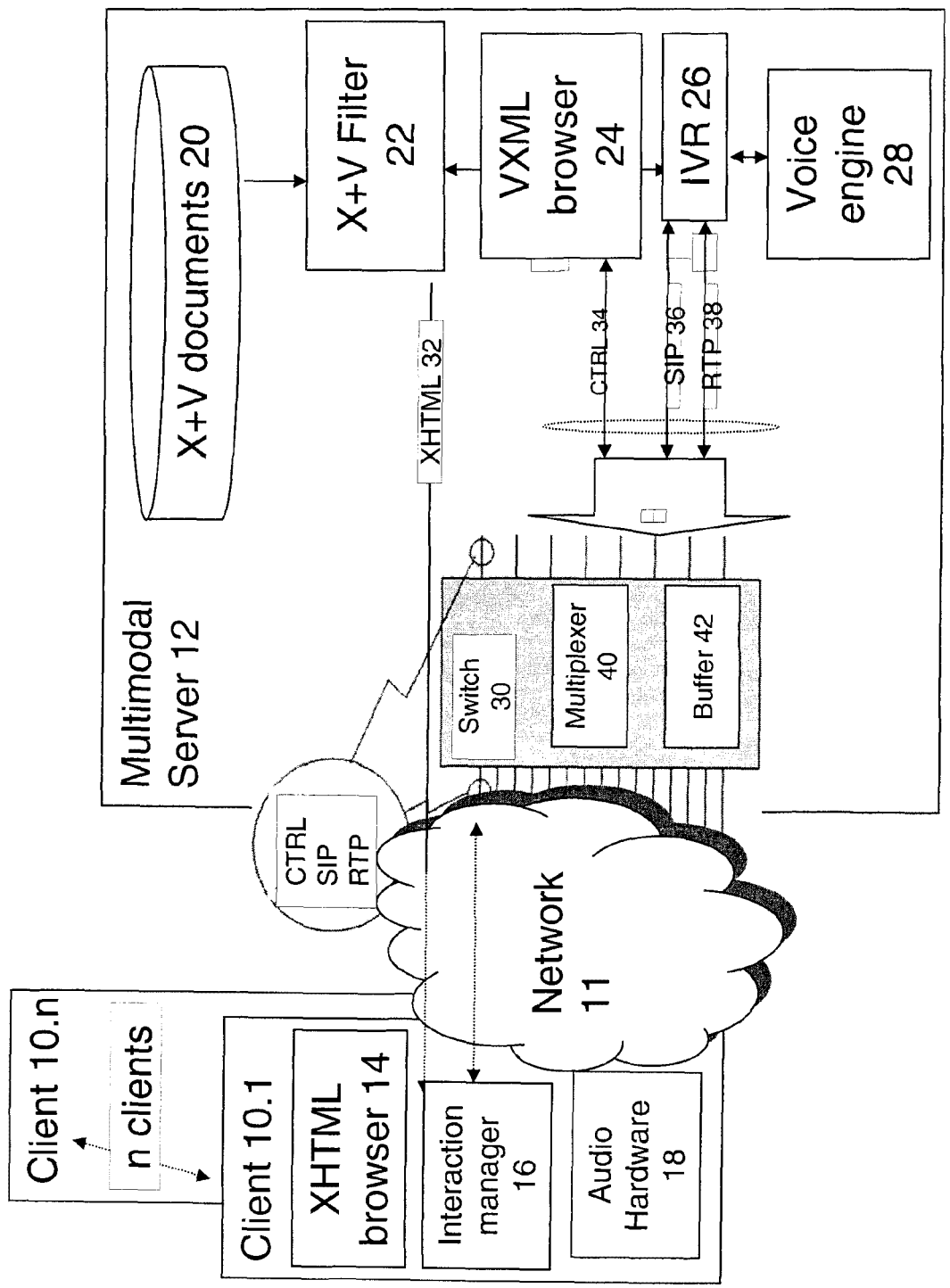
FIG. 1 is a representation of n clients an a multimodal server of the present invention.

The system of the preferred embodiment comprises a plurality of clients 10.1 to 10.n connected through a network 11 to a multimodal server 12. Each client 10 comprises: an XHTML browser 14; an interaction manager 16; and audio hardware 18. The server 12 comprises: an X+V document database 20, an XHTML+Voice(X+V) filter 22; a VoiceXML (VXML) browser 24; an interactive voice response system (IVR) 26; a voice engine 28; and a switch 30.

The network 11 carries: an XHTML (X) channel 32; a CTRL (control) channel 34; a SIP (Session Initialisation Protocol) channel 36; and an RTP (Real-Time Protocol) channel 38. The X channel 32 carries the XHTML application for the X+V interaction. In the preferred embodiment the CTRL channel 34 carries a sync signal for synchronising corresponding XHTML and VXML fields. X+V defines the concept of corresponding fields in XHTML forms and VXML forms. A sync data event signal is sent when a multimodal interaction can take place and a sync data signal is sent after the interaction to synchronise one XML field with the corresponding XML fields. The RTP channel 38 carries the data for the audio. The SIP channel 36 is used to setup the RTP channel. The CTRL, RTP and SIP channels do not connect the client 10 directly to the VXML browser 24/IVR 26 but via the switch 30. The switch 30 consumes very little resource and can therefore[4] support a large number of concurrent clients 10, larger than the IVR capacity available.

The preferred embodiment is described with respect to one client 10 and one RTP channel 38 but the advantages of the invention become apparent when there are many more clients than there are voice channels.

The client XHTML browser 14 interprets an XHTML document received via the X channel 32. The XHTML browser 14 is a known XHTML browser with added functionality to interact with a VXML browser and interact with audio hardware.

The interaction manager 16 controls the interactions between the XHTML browser 14 and the VXML browser 24 by sending and receiving control information on the CTRL (control) channel 34 and SIP (Session Initialisation Protocol) channel 36. The important aspects of the interaction between the XHTML browser 14 and the VXML browser 24 are the sync event signal which is sent from interaction manager 16 just before the voice interaction and the sync data signal which is sent after the voice interaction. The sync event signal triggers a voice dialogue in the VXML browser 24. The sync data signal synchronizes the corresponding field data after the voice interaction.

The audio content is sent and received on the RTP (Real-Time Protocol) channel 38 by the audio hardware under the control of the interaction manager 16.

The X+V document database 20 stores X+V documents and sends them on request to the X+V filter 22.

The X+V filter 22 acquires X+V documents from the X+V document database 20 on request from an XHTML browser 14. The X+V documents are filtered into the XHTML component parts and VXML component parts. The XHTML component parts are sent to the XHTML browser 14 and the VXML component parts are sent to the VXML browser 24. The XHTML component part contains voice handlers to show corresponding X and V fields and mark the parts of the XHTML where interaction with the VXML browser is required.

The VXML browser 24 is a conventional VXML browser. The VXML browser receives requests to perform voice interactions using VXML component parts of an X+V document for an X+V session. The VXML browser manages voice interactions within that X+V session. Processing of individual voice functions is passed to the IVR.

Although in the preferred embodiment the VXML browser 24 and X+V filters are shown in the server 12 they could also be implemented on the client 10.

The IVR 26 processes voice interactions. Pre-recorded prompts can be played in response to requests from a browsed VXML document parts and dual tone multi-frequency signals (DTMF) received as inputs to browsed VXML document parts. The IVR 26 also interfaces the voice engine 28. The IVR 26 connects to the SIP channel 36 and RTF channel 38 through the switch 30.

The voice engine 28 performs speech recognition input and text-to-speech output for the IVR 26.

The switch 30 comprises a multiplexer 40 and a buffer 42. The multiplexer 40 connects one of a large number of client voice links (between itself and potentially thousands of mobile device clients) with one of a smaller number of IVR voice links (between itself and the IVR). When the switch 30 intercepts a sync event signal on a control channel (CTRL) it connects the corresponding client voice link with an IVR voice link to create a virtual voice circuit between the client and an IVR port.

Once created, the sync event signal is passed through to the VXML browser 24 for processing of the voice interaction.

The VXML browser 24 may update the VXML field and then instruct the IVR 26 to play a prompt and take voice input over the virtual circuit. The virtual circuit lasts only for the duration of a single voice interaction (a 'conversational turn') and the end of the interaction is signaled by a sync data signal. On trigger of the sync data signal the switch 30 disconnects the virtual circuit. Voice resources for the virtual link can then be reused by another client device immediately upon disconnection. For scalability, the switch could be connected by a high speed network to the IVR.

In the preferred embodiment RTP channels 38 are opened at the first voice interaction during a X+V session. Alternatively the switch can be configured to open an RTP sessions before the first voice interaction at the start of the X+V session. For the pre-opened RTP channels, the voice channel between the switch 30 and the IVR 26 remains connected. This means that when a new virtual circuit needs to be set up, it becomes simply a case of setting up the routing within the switch and no additional physical call set up with the IVR needs to take place. In practice this means adding negligible latency to the response time of the system.

In the event that all physical IVR ports are in use (i.e. too many devices are attempting to perform voice interaction at the same time), the switch 30 can store the audio in the buffer 42. When later an IVR port becomes available a virtual circuit is set up and the buffered audio is played back to the IVR thus completing the interaction (e.g. leaving a voice message). Of course, if this happens too often, then it means that the system is at 100% utilisation and additional IVR ports are required.

To illustrate the method of the present embodiment the events of two typical voice interactions are now described with reference to the event diagram of FIG. 2 and an example.

Using a handheld PDA a user surfs to a flight information website to find out the estimated time of arrival of a flight. The GUI displays the enquiry form with two fields: the flight number and date of flight. The user focuses on the first field and an audio prompt is played "please enter the flight number". The user enters the flight number using the keyboard on his PDA (this interaction is described with reference to the 'web sync' below). The user then focuses on the next field and an audio prompt is heard 'please enter the date'. This time the user uses the audio hardware says 'today' into a microphone. The voice data is processed and that day's date is automatically inserted into the date field. This interaction is described in the 'voice sync' event sequence below. In this example the two fields are filled in and the flight information site returns the estimated time of arrival—in text form or voice or both.

Initially the client 10 requests 50 that a voice channel 38 be set up and a one time SIP request is sent on the SIP channel 36 to the IVR 26 to set up a voice channel 38. However, instead of a client 20 to server voice channel 38, one client link between the switch 30 and the client is set up 52 and at least one server link between the switch and the server is set up 54. The client link and the server link form a connectable voice circuit which may be connected and then disconnected by the switch. The number of server links is limited by the number of ports on the IVR and the number of client links is limited by the implementation of the switch 30.

Figure 2:
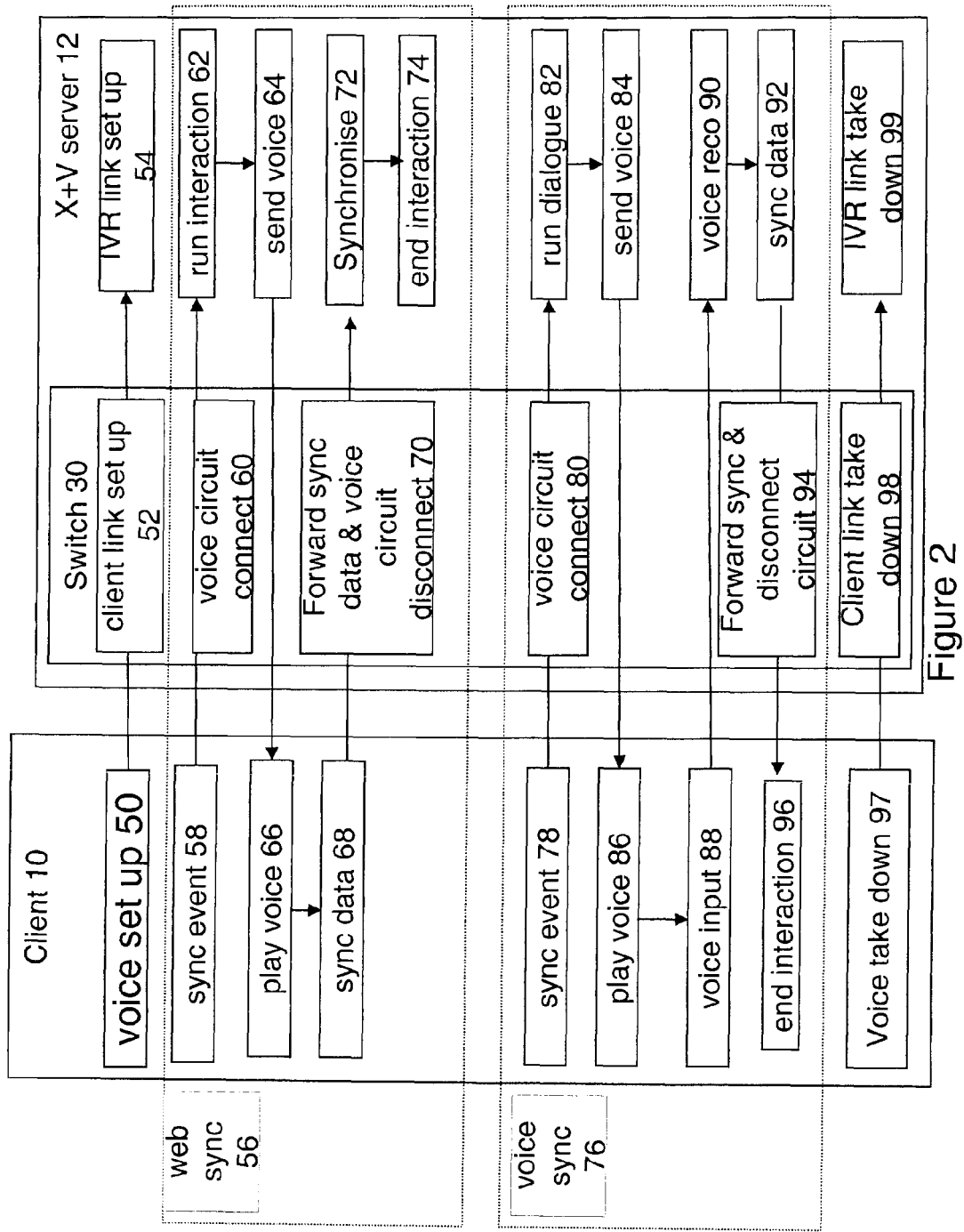
FIG. 2 is a sequence diagram between one client and the multimodal server in the multimodal system of the present invention.

In FIG. 2, a web sync interaction 56 shows the events in an interaction in which a XHTML field is brought into focus in the client XHTML browser and synchronized with a corresponding VXML field. Since the XHTML field has a corresponding VXML field a sync event signal is sent 58 from the client to the server. The sync event is intercepted by the switch which first connects 60 the voice circuit before forwarding the sync event to the VXML browser on the X+V server. When the VXML browser receives the sync event it finds the corresponding VXML components and runs 62 the components as the voice interaction. In this example, the voice interaction sends 64 a voice prompt over the newly connected voice channel. The client receives the voice prompt and plays 66 it using the audio hardware. However, in this example, the user chooses to respond to the voice prompt using the XHTML interface to enter a response so there is no immediate VXML response. The user enters data into the XHTML field using the graphical interface. The XHTML field has a corresponding VXML field and synchronisation follows. The interaction manager sends 68 a sync data signal on the CTRL channel to the X+V server—this is a sync data signal including the entered XHTML data. The sync data signal is intercepted by the switch before forwarding on to the VXML browser for entry into the VXML field. Since the CTRL signal is a sync data signal the switch knows to disconnect 70 the virtual voice circuit. The VXML browser synchronizes 72 the VXML data and ends 74 the voice interaction.

A voice sync interaction 76 in FIG. 2 shows the events in an interaction in which data is entered into a VXML field in the server VXML browser and synchronized with a corresponding XHTML field in the client browser. When a XHTML field with a corresponding VXML field is brought into focus in the graphical interface a sync event signal is sent 78 from the interaction manager to the server via the switch. The sync event is intercepted by the switch which connects 80 a client link to an IVR link to form a voice circuit. The sync event is forwarded to the VXML browser on the X+V server. When the VXML browser receives the sync event it runs 82 the corresponding VXML interaction. In this example, the voice interaction sends 84 a voice prompt over the newly connected voice channel. The client receives the voice prompt and plays 86 it using the audio hardware. In this example, the user responds to the voice prompt by speaking a response into the audio hardware, e.g. 'today'. The voice data is sent 88 through the virtual voice circuit created by the switch and to the IVR. The IVR sends the voice data to the voice engine for recognition 90 and enters the resulting text data into the VXML field. The VXML field has a corresponding XHTML field and a sync data signal is sent 92 to the interaction manager along the CTRL channel. After forwarding the sync data signal to the interaction manager the switch disconnects 94 the voice circuit. The client ends 96 the interaction. The X+V server processes the data in the fields and outputs the result.

Only when the client device is about to be switched off is a voice take down signal sent 97. In response to this signal, the switch takes down 98 the client link and the server takes down 99 the IVR link.

In summary, the embodiment is based on being able to locate a voice server, temporarily allocate it, send it audio such as "When is today's flight 683 due to arrive?", getting the results of what was said back in the browser, and deallocating the voice server for use by the next person talking into their browser. Voice channels and IVR ports are initially set up by a switch and the IVR using conventional audio protocols. The voice channels are not initially connected to the client. The switch handles the allocation and deallocation of IVR voice channels without having to establish continuous communication with the IVR. A user indicates (usually by pressing a PTT button) to the client device that he wishes to initiate a voice interaction during an X+V session. This translates to a request on the CTRL channel to synchronise the XHTML and VXML forms which the embodiment uses as a trigger for the VXML browser to execute a conversational turn. The multiplexer intercepts this control command and connects the virtual voice circuit between the device and an existing open but unattached voice port. The virtual circuit is connected without having to set up an RTP channel. The CTRL signal is then forwarded to the interaction manager so that the conversation can take place. At the end of the conversation the virtual circuit is disconnected.

The invention claimed is:

1. A method for controlling an audio connection between an audio interface with a client and an audio processor with a remote voice server comprising:
   setting up a processor link for audio data with the audio processor and a server switch;
   setting up an audio interface session comprising establishing an interface link for audio data with the audio interface and the server switch;
   in response to a signal indicating the start of an audio interaction comprising a multimodal dialogue within the audio interface session, connecting, by the server switch, the processor link and the interface link whereby audio data can flow between the audio interface and the audio processor, and wherein the server switch is to buffer and play back the audio data to the audio processor later if all ports on the audio processor are being utilized;
   in response to a signal indicating the end of the audio interaction comprising synchronization of fields in the multimodal dialogue, terminating the audio interface session by disconnecting, by the server switch, the processor link and the interface link; and
   in response to the end of the interface session, taking down the interface link.

2. A method according to claim 1 wherein the audio processor is an interactive voice response system for speech recognition.

3. A method according to claim 2 wherein the audio interface is an XML browser with voice functionality for multimodal operation.

4. A method according to claim 3 wherein the buffering and the playing back of the audio data is based on a delay connecting the interface link with the processor link.

5. A method according to claim 4 wherein the setting up of a processor link with the audio processor further comprises negotiating a RTP connection using SIP protocol.

6. The method according to claim 5 wherein the signal indicating the start of an audio interaction is a pre-existing signal.

7. A method according to claim 6 wherein the signal indicating the end of an audio interaction is a pre-existing signal.

8. A switch for controlling an audio connection from an audio interface with a client to an audio processor with a remote voice server comprising:
   means for setting up a processor link for audio data with the audio processor and a server switch;
   means for setting up an audio interface session comprising establishing an interface link for audio data with the audio interface and the server switch;
   means for, in response to a signal indicating the start of an audio interaction comprising a multimodal dialogue within the audio interface session, connecting the processor link and the interface link whereby audio data can flow between the audio interface session and the audio processor, and wherein the server switch is to buffer and play back the audio data to the audio processor later if all ports on the audio processor are being utilized;
   means for, in response to a signal indicating the end of the audio interaction comprising synchronization of fields in a multimodal dialogue, terminating the audio interface session by disconnecting, by the server switch, the processor link and the interface link; and means for, in response to the end of the interface session, taking down the interface link.

9. A multimodal web server comprising:

an Extensible HyperText Markup Language (XHTML) and voice documents database;

an XHTML and voice filter;

a Voice Extensible Markup Language (VoiceXML) browser;

an interactive voice response server (IVR);

a voice server; and a switch for controlling an audio connection from a client audio interface to the IVR, said switch comprising:

means for setting up an IVR link for audio data with the IVR;

means for setting up an client interface link for audio data with the client audio interface;

means for, in response to a signal indicating the start of an audio interaction comprising a multimodal dialogue, connecting the IVR link and the client interface link, whereby audio data can flow between the client audio interface session and the IVR, and wherein the switch is to buffer and play back the audio data later to the IVR if all ports on the IVR are being utilized;

means for, in response to a signal indicating the end of the client audio interaction comprising synchronization of fields in the multimodal dialogue, disconnecting, by the switch, the IVR link and the client interface link; and means for, in response to the end of the client interface session, taking down the client interface.

10. A computer program product for controlling an audio connection between an audio interface with a client and an audio processor with a remote voice server, said computer program product including a computer readable storage device having computer usable program code embodied therewith, said computer program code comprising:

computer usable program code configured to set up a processor link for audio data with the audio processor and a server switch;

computer usable program code configured to set up an audio interface session comprising establishing an interface link for audio data with the audio interface and the server switch;

computer usable program code configured to, in response to a signal indicating the start of an audio interaction comprising a multimodal dialogue within the audio interface session, connect the processor link and the interface link whereby audio data can flow between the audio interface and the audio processor, and wherein the server switch is to buffer and play back the audio data to the audio processor later if all ports on the audio processor are being utilized;

computer usable program code configured to, in response to a signal indicating the end of the audio interaction comprising synchronization of fields in a multimodal dialogue, terminate the audio interface session by disconnecting, by the server switch, the processor link and the interface link; and computer usable program code configured to, in response to the end of the interface session, take down the interface link.

11. A computer program product according to claim 10 wherein the audio processor is an interactive voice response system for speech recognition.

12. A computer program product according to claim 11 wherein the audio interface is an XML browser with voice functionality for multimodal operation.

13. A computer program product according to claim 12 wherein the buffering and the playing back of the audio data is based on a delay connecting the interface link with and processor link.

14. A computer program product according to claim 13 wherein the computer usable program code configured to set up an interface link for audio data with the audio interface further comprises computer usable program code configured to negotiate an RTP connection using SIP protocol.

15. A computer program product according to claim 14 wherein the signal indicating the start of an audio interaction is a pre-existing signal.

16. A computer program product according to claim 15 wherein the signal indicating the end of an audio interaction is a pre-existing signal.

17. An apparatus for controlling an audio connection from a client audio interface to a interactive voice response server (IVR), said apparatus comprising:

means for setting up an IVR link for audio data with the IVR;

means for setting up an client interface link for audio data with the client audio interface;

means for, in response to a signal indicating the start of an audio interaction comprising a multimodal dialogue, connecting the IVR link and the client interface link, whereby audio data can flow between the client audio interface session and the IVR, and wherein a server switch is to buffer and play back the audio data to the IVR later if all ports on the IVR are being utilized;

means for, in response to a signal indicating the end of the client audio interaction comprising synchronization of fields in the multimodal dialogue, disconnecting, by the server switch, the IVR link and the client interface link; and means for, in response to the end of the client interface session, taking down the client interface.

* * * * *